United States Patent
Sadowara

(10) Patent No.: US 7,330,289 B2
(45) Date of Patent: Feb. 12, 2008

(54) COLOR IMAGE FORMING APPARATUS

(75) Inventor: Tetsuya Sadowara, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 687 days.

(21) Appl. No.: 10/816,837

(22) Filed: Apr. 5, 2004

(65) Prior Publication Data

US 2005/0225801 A1   Oct. 13, 2005

(51) Int. Cl.
*G06F 19/00* (2006.01)
*G03F 3/08* (2006.01)
*G09G 5/00* (2006.01)

(52) U.S. Cl. .................. 358/1.9; 358/1.16; 358/518; 345/589; 345/590

(58) Field of Classification Search ............. 358/1.16, 358/1.9, 518, 1.15; 345/589, 590
See application file for complete search history.

(56) References Cited

U.S. PATENT DOCUMENTS

2002/0030846 A1* 3/2002 Moriyama et al. ......... 358/1.15

FOREIGN PATENT DOCUMENTS

JP        9-174952 A      7/1997

* cited by examiner

*Primary Examiner*—Alexander Eisen
*Assistant Examiner*—Iriana Cruz
(74) *Attorney, Agent, or Firm*—Foley & Lardner LLP

(57) ABSTRACT

In a color image forming apparatus in which images of a plurality of element colors are sequentially transferred to form a color image, there are provided a plurality of RAM/register units with respect to one image processing unit. Control information is previously stored in the RAM/register units, so that the switching of the element color to be transferred is achieved by switching the RAM/register units, not by rewriting the contents of the RAM/register unit. Thereby, simplification of constitution and high-speed printing can be achieved.

4 Claims, 6 Drawing Sheets

FIG.2

| CPU ADDRESS | CHIP SELECT SIGNAL | OBJECT RAM/REGISTER UNIT | ADDRESS IN RAM/REGISTER UNIT |
|---|---|---|---|
| 0000h~0FFFh | YCS-0 | Y-COLOR RAM/REGISTER UNIT | 000h-FFFh |
| 1000h~1FFFh | MCS-0 | M-COLOR RAM/REGISTER UNIT | 000h-FFFh |
| 2000h~2FFFh | CCS-0 | C-COLOR RAM/REGISTER UNIT | 000h-FFFh |
| 3000h~3FFFh | KCS-0 | K-COLOR RAM/REGISTER UNIT | 000h-FFFh |

PRIOR ART

PRIOR ART

COLOR IMAGE FORMING APPARATUS

BACKGROUND OF THE INVENTION

1. Field of the Invention

The present invention relates to a color image forming apparatus which forms a color image, in particular, to an improved processing control technique of image data.

2. Description of Related Art

In the field of image forming apparatus, such as a color copy machine, color page printer, etc., which performs color printing by one page through the electronic photographic method, as one of the color printing methods, the four-rotation method is known. According to the four-rotation method, one printing unit, which consists of a photosensitive member, a toner drum, etc., is provided, whereby element colors such as, yellow (Y), magenta (M), cyan (C), and black (B) are sequentially transferred on a intermediate transfer member until transfer with respect to all the element colors is completed; and after completing the transfer on the intermediate transfer member, the image carried on the intermediate transfer member is transferred on a piece of paper, whereby color printing is performed. Under this method, transfer of each element color onto the intermediate transfer unit is performed in a manner that the transferring operations do not overlap one another in terms of timing as shown in FIG. 4, that is, after completing transfer of an element color, the transfer of the next element color is started.

As an image processing control mechanism which realizes the printing according to the above-mentioned four rotation method, the mechanism shown in FIG. 5 conventionally is known. According to this type, with respect to one element color, one pair of a RAM/register unit and image processing unit is provided (that is, four pairs are provided in the entire apparatus), transfer of each element color is performed by the pair associated with the element color. However, due to the configuration in which one picture image processing unit is provided with respect to each element color; when an element color is transferred, the other image processing units associated with the other element colors are not used. Thus, this type is problematic in that there is a redundancy in the constitution, so that a useless production cost is generated.

As an image processing mechanism of the other types which solves the redundancy of the constitution, the image processing mechanism shown in FIG. 6 is known. According to this type, only one pair of RAM/register unit and a image processing unit is provided, and changing of element color to be transferred is executed by rewriting the stored contents in the RAM/register unit. However, this type is problematic in that the rewriting requires a predetermined time, so that the printing speed is slowed down, and then the apparatus cannot cope with the recent tendency that high-speed printing is demanded. In particular, this problem has become noticeable these days because there is a tendency that the color images are becoming of high-quality which increases the data amount required for image processing and consequently elongating the rewriting time.

SUMMARY OF THE INVENTION

Accordingly, an object of the present invention is to provide a color image forming apparatus which enables high-speed printing without complicating the constitution of the image processing control mechanism.

The present invention provides a color image forming apparatus (for example, color copy machine) in which images of a plurality of element colors (for example, yellow, magenta, cyan, black) are sequentially transferred to form a color image, the color image forming apparatus comprising: (i) control means (for example, CPU) for giving control data, to be used for processing control of the image data associated with the element color, and address; (ii) a plurality of temporary storage means (for example, RAM/register unit) each being provided for each of the element colors and temporarily storing control data supplied from the control means in an address of its own obtained on the basis of the address supplied from the control means; (iii) writing selection means (for example, chip select signal generating unit) which generates, on the basis of the address supplied from the control means, the selection signal to select one of the plurality of temporary storage means; (iv) image processing means (for example, image processing unit) which processes, on the basis of the control data stored in the plurality of temporary storage means, an image data associated with a received element color; and (v) printing means (for example, printer unit) which performs transfer of an element color on the basis of the processing result of the image processing means and gives a color code representing an element color which is being subjected to transferring.

Accordingly, it becomes possible to perform image processing adequate for each element colors to be printed, by storing control data with respect to a plurality of element colors in the temporary storage means previously and switching the corresponding temporary storage means.

BRIEF DESCRIPTION OF THE DRAWINGS

FIG. 2 is a table which shows the relationship between an address space and respective element color RAM/register units and the like;

BEST MODE FOR CARRYING OUT THE INVENTION (1) First Embodiment

Hereinafter, referring to FIGS. 1 and 2, a first embodiment of the image forming apparatus according to the present invention will be described.

(1-1) Constitution of First Embodiment

Figure 1:
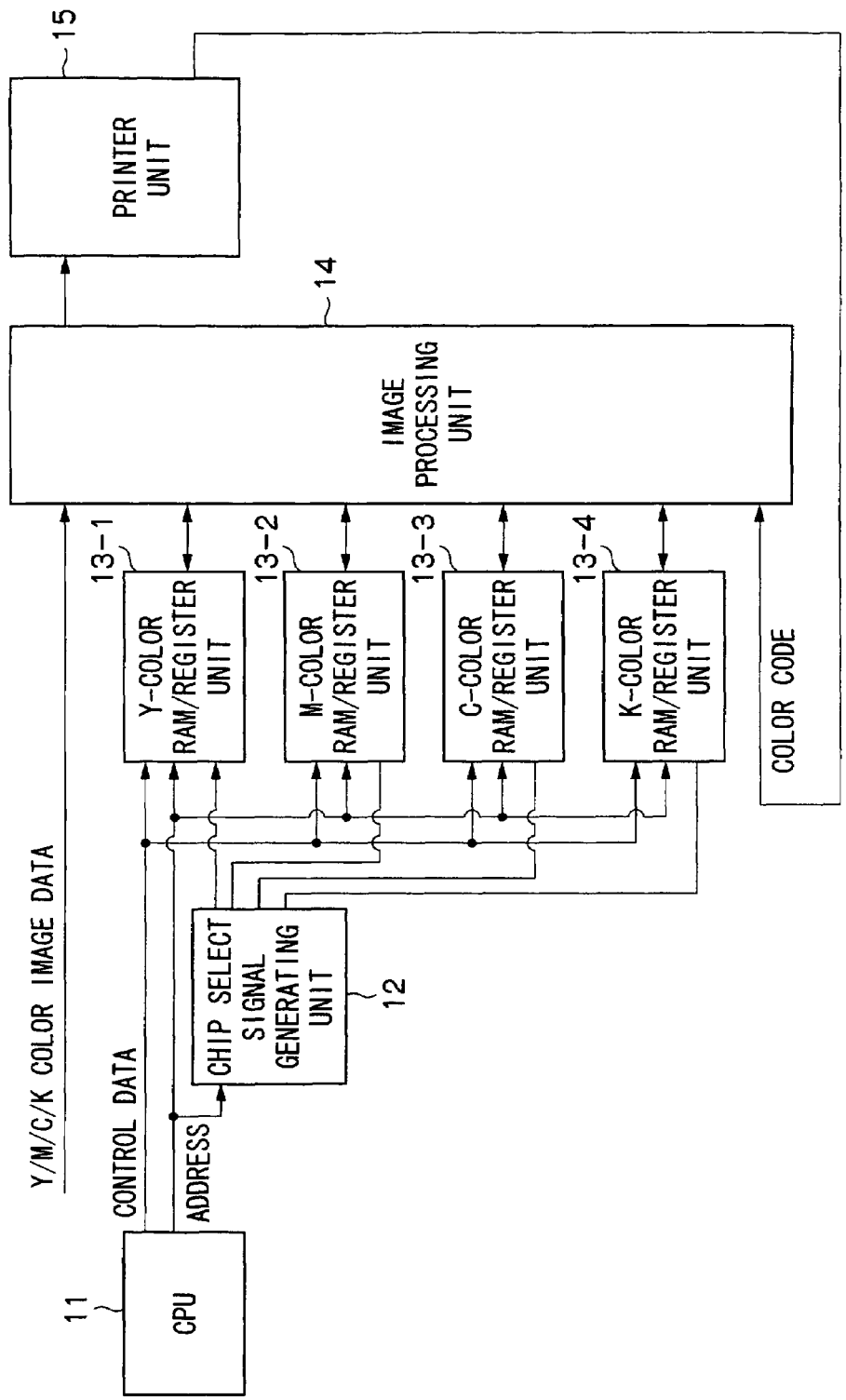
FIG. 1 is a view showing the constitution of an image forming processing control unit in the color image forming apparatus according to a first embodiment of the present invention.

As shown in FIG. 1, the color image forming apparatus according to the first embodiment is roughly constituted by a CPU (central processing unit) 11, chip select signal generating unit 12, respective element color RAM/register units 13-1 to 13-4, an image processing unit 14, and a printer unit 15.

Here, the CPU 11 is a unit which is constituted by, for example, a micro computer, and adapted to supply control data to the respective RAM/register units 13-1 to 13-4, and to supply an absolute address to the chip select signal generating unit 12 and the respective RAM/register units 13-1 to 13-4.

The chip select signal generating unit 12 is a unit which is adapted to decode the absolute address supplied from the CPU 11, and to generate a chip select signal on the basis of the data obtained by the decoding, and supply the respective RAM/register units 13-1 to 13-4.

The respective element color RAM/register units 13-1 to 13-4 are units each of which is adapted to receive the control address and the absolute address from the CPU 11, and a chip select signal from the chip select signal generating unit 12, and to give control data to the image processing unit 14. The element color RAM/register units are provided with respect to four colors: yellow (hereinafter occasionally referred to as "Y" or "Y-color"), magenta (hereinafter occasionally referred to as "M" or "M-color"), cyan (hereinafter occasionally referred to as "C" or "C-color"), and black (hereinafter occasionally referred to as "B" or "B-color") (hereinafter, these four colors are occasionally referred to as "element color"). The number of RAMs and registers of each element color RAM/register unit 13-1~13-4 are arbitrary. The respective element color RAM/register units 13-1 to 13-4 mutually have the same configuration. Accordingly, the reason why the respective element color RAM/register unit executes their specific actions, that is, actions different those of the other element color RAM/register units is that the information stored in the respective element color RAM/register units are different from one another. The reference numerals employed for the respective element color RAM/register units are: 13-1 for Y-color RAM/register unit; 13-2 for M-color RAM/register unit; 13-3 for C-color RAM/register unit; and 13-4 for K-color RAM/register unit.

The image processing unit 14 is a unit which is adapted to process a color image data read by and transferred from an image reading unit (not shown), on the basis of the control data supplied from the respective RAM/register units 13-1 to 13-4, and to supply the image data thus processed to the printer unit 15. The image processing unit 14 also receives a color code supplied from the printer unit 15.

The printer unit 15 is a unit which performs printing action on the basis of processed image data supplied from the image processing unit 14. The printer unit 15 also supplies a color code to the image processing unit 14.

(1-2) Operation of First Embodiment

Next, referring to FIGS. 1 and 2, the operations of the color image processing apparatus having the above-mentioned constitution will be described. The operations are different depending on the cases: where the CPU accesses the respective element color RAM/register unit and when a printing action is performed, so that explanations will be made with respect to these cases.

(1-2-1) In Accessing from CPU

The operations performed when accessed from the CPU will be described. In the following explanations will be made on an assumption that the address space associated with the CPU output and the RAM/register units of the respective element colors have the relationship shown in FIG. 2. Further, an explanation will be made by way of the case where a control data FFh is written in the absolute address 1008h.

First, an absolute address 1008h is supplied from the CPU 11 to the chip select signal generating unit 12. At the chip select signal generating unit 12, the absolute address 1008h thus supplied is decoded, so that a chip select signal is generated on the basis of the data obtained through the decoding. In this case, the uppermost digit of the address supplied from the CPU 11 is "1", the chip select signal to be generated is, as shown in FIG. 2, MCS-0, which causes only the M-color RAM/register unit to be write-enable state. Then, the chip select signal MCS-0 thus generated is supplied to the respective element color RAM/register units 13-1 to 13-4. In the present embodiment, the chip select signal is defined as negative logic (active low). Specifically, a signal of an L-level serves as a chip select signal, and the writing-in of data is performed with respect to the RAM/register unit which has received such a chip select signal.

In parallel with this, at the CPU 11, "008h" of the lowermost three digits of the absolute address 1008h is separated. Then, the control data FFh corresponding to the address, along with the lowermost three-digit addresses "008h" obtained by the separation, is supplied to each of the element color RAM/register units 13-1 to 13-4.

At each of the element color RAM/register units 13-1 to 13-4, writing or non-writing, of the data, is executed on the basis of the signals and data, thus supplied. Specifically, in this case, since the chip select signal MCS-0 thus supplied is a signal which causes only the M-color RAM/register unit 13-2 to be a write-enable state, and an address 008h in the RAM/register unit 13-2 is specified, the control data is written in the address 008h of the RAM in the RAM/register unit 13-2. By contrast, the remaining Y-color RAM/register unit 13-1, C-color RAM/register unit 13-3, and K-color RAM/register unit 13-4 are not caused to be a write-enable state by the chip select signal MCS-0, the above-mentioned writing is not executed at the Y, C and K-color RAM/register units 13-1, 13-3, 13-4.

In the case where an address and a control data are other than the above-mentioned ones, the same processings are performed. For example, the absolute address output from the CPU 11 is 2006h and the control data is E7h, a chip select signal CCS-0 is generated, and the control data E7h is written in 006h of the C-color RAM/register unit 13-3.

In this way, during the period when the CPU 11 is accessed, when time is comparatively ample, the absolute address and control data are sequentially output, and written in the respective RAM/register units by way of the above procedure. This writing operations are continued till supplying of the control data and address from the CPU 11 to the chip select signal generating unit 12 and RAM/register units 13-1 to 13-4 are terminated.

(1-2-2) Print-outputting

When the writing of control data is completed, at the image processing unit 14, processing of color image data is started. Processing of the color image data is performed in a manner that element color image data supplied from the image data generating unit (not shown) is processed on the basis of the control data stored in the element color RAM/register units 13-1 to 13-4. Then, color image data thus processed is supplied to the printer unit 15.

In the printer unit 15, a printing action is executed on the basis of the processed color image data supplied from the image processing unit 14. While printing actions performed in color copy machines, or the like usually includes the steps of charging, exposure, development, transfer, and fixing; the term "printing action" as used herein refers to an action of transferring an image onto the intermediate transferring member.

During the period when the printing action is being executed, a color code is supplied from the printer unit 15 to the image processing unit 14. The color code is a signal which shows what element color is being currently transferred at the printer unit 15. Through the color code, it is confirmed that a printing action is duly being executed according to the control data. When an element color to be transferred is intended to be changed to the next one, it is necessary to switch the RAM/register unit which supplies control data to the image processing unit 14. The color code is used also for switching the RAM/register unit.

(1-3) Advantage of the First Embodiment

As described above, according to the present embodiment, only one image processing unit is provided, so that such a redundancy in constitution that a unused image processing unit exists can be prevented, whereby the production cost can be reduced.

Further, since the configuration is adopted in which the RAM/register units are provided with respect to the respective element color and control data is previously written in; when the element color to be transferred is switched, it is not necessary to change the stored contents of the RAM/register unit; whereby high-speed printing can be performed.

(2) Second Embodiment

Next, referring to FIG. 3, a second embodiment of the present invention will be described.

Figure 3:
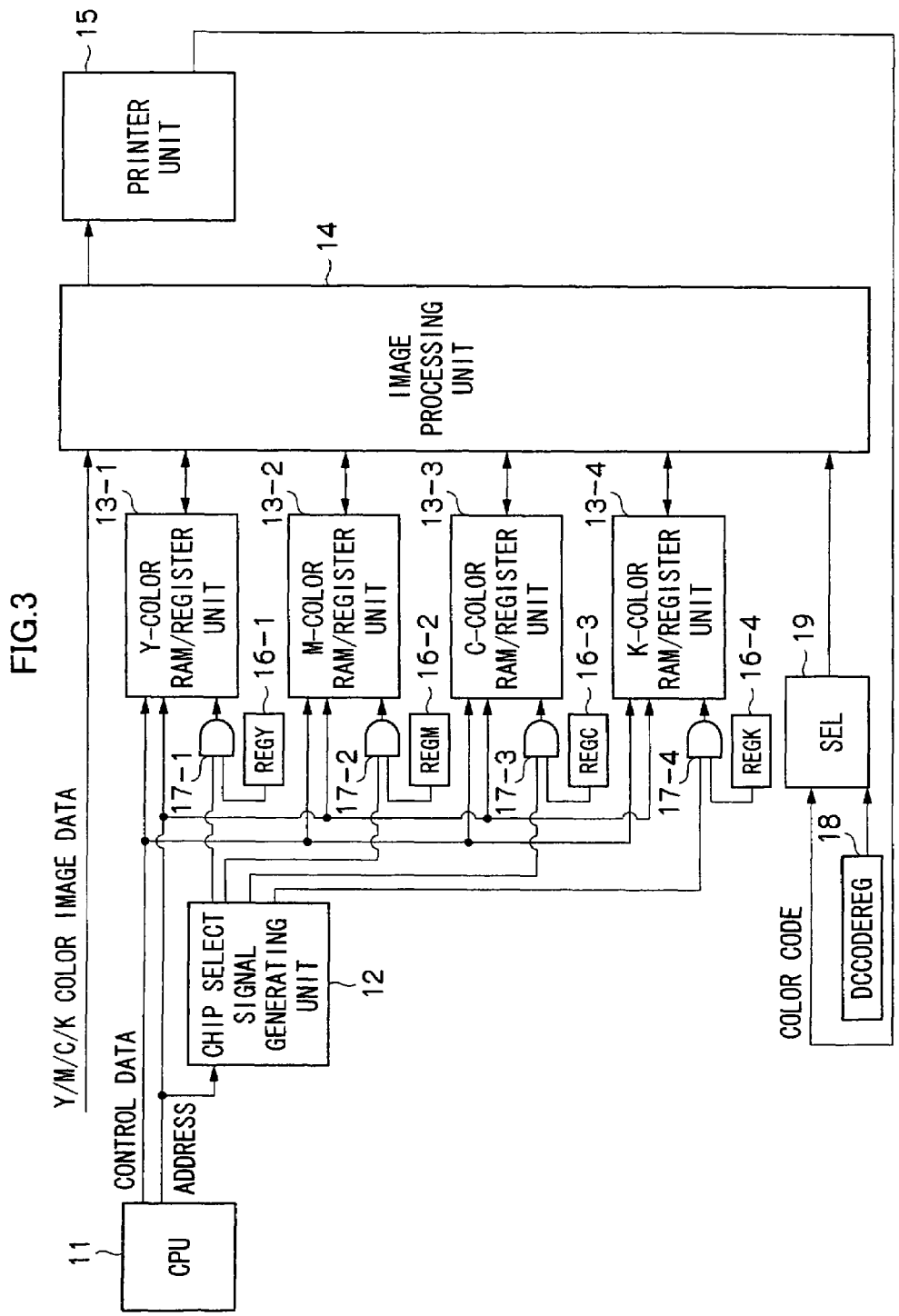
FIG. 3 is a view showing the constitution of an image processing control unit in the color image forming apparatus according to a second embodiment of the present invention.
Figure 4:
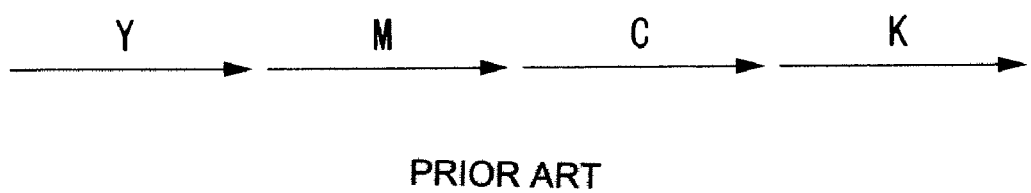
FIG. 4 is a chart schematically showing the timing of the transfer of each element color according to a four-rotation method.
Figure 5:
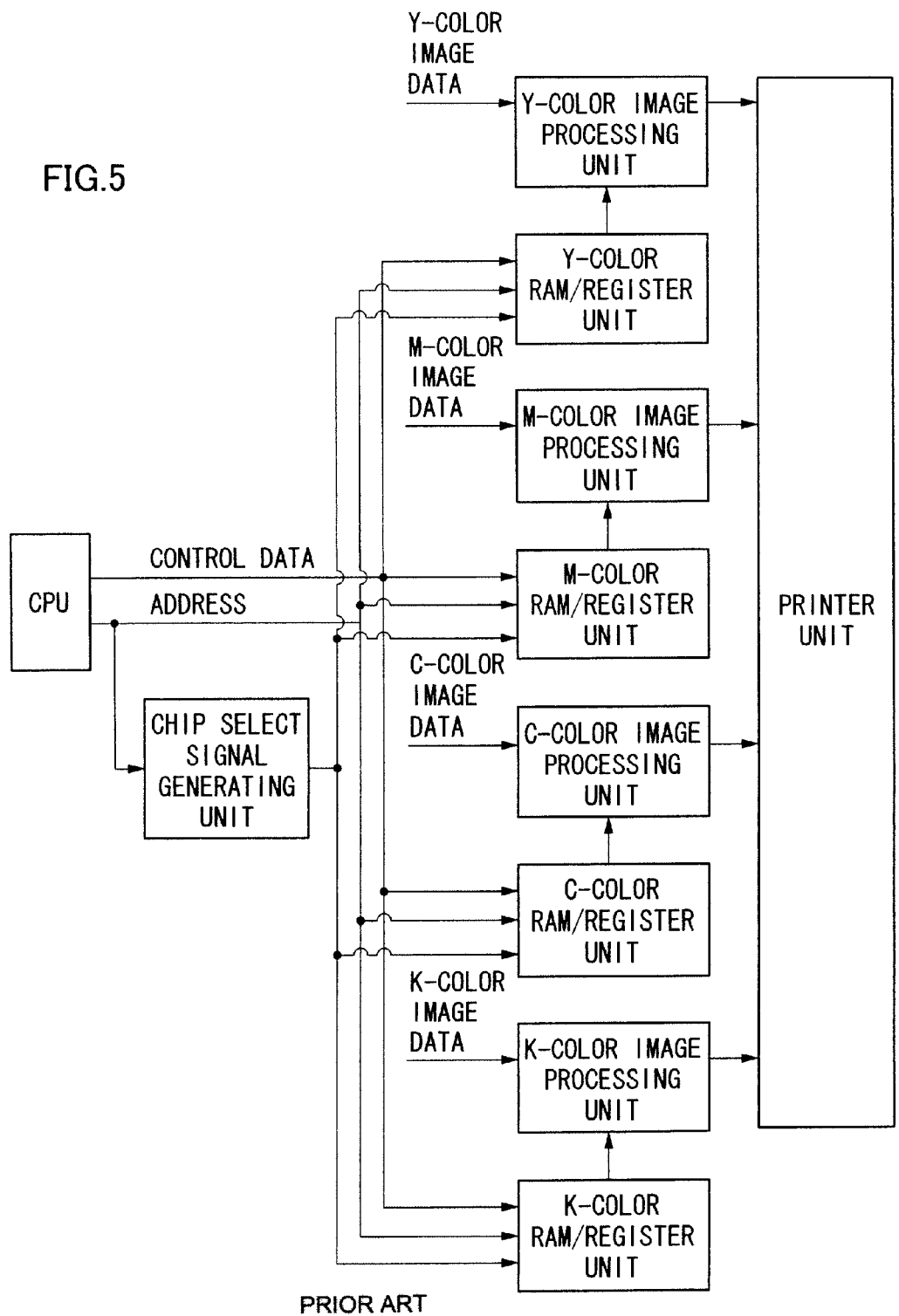
FIG. 5 is a view showing an example of the constitution of a conventional image processing control unit.
Figure 6:
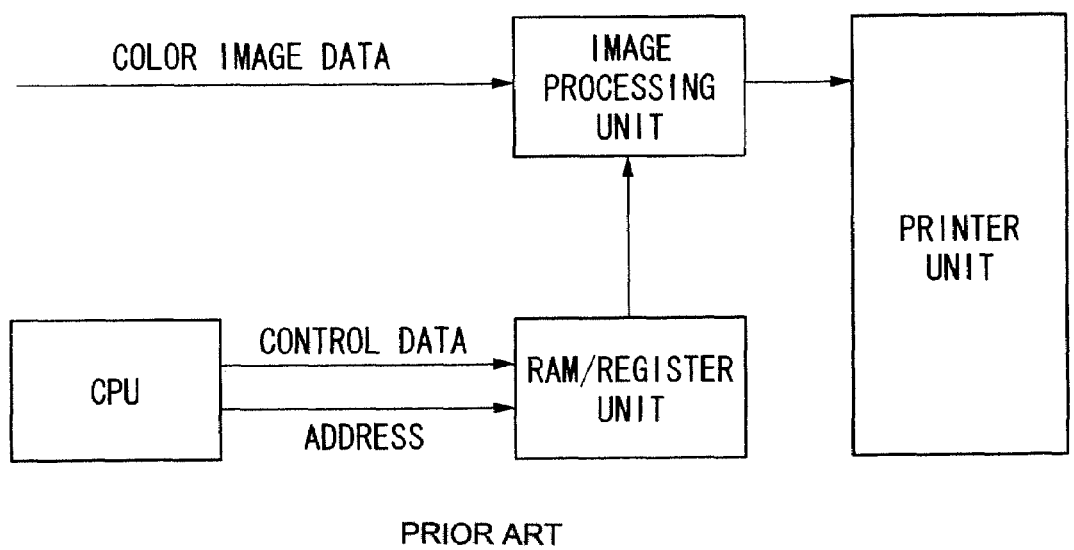
FIG. 6 is a view showing another example of a conventional image processing control unit.

FIG. 3 shows a constitution of the color image forming apparatus according to the second embodiment. In FIG. 3, some of the members constituting the color forming apparatus according to the second embodiment are the same as those of the first embodiment in constitution and operation, so that such members are denoted by the same reference numerals. Specifically, the CPU 11, the chip select signal generating unit 12, the respective RAM/register units 13-1 to 13-4, the image processing unit 14, and the printer unit 15 of the second embodiment are the same as the corresponding members of the first embodiment.

Characteristic features of the second embodiment which are different from those of the second embodiment are as follows:

First, element color additional registers 16-1 to 16-4 are newly provided, in which a signal for causing corresponding RAM/register units 13-1 to 13-4 to be write-enable (Note that, in FIG. 3, Y-color additional register is denoted by REGY, and similarly, M-color additional register is denoted by REGM, C-color additional register is denoted by REGC, K-color additional register is denoted by REGK; and these notations in FIG. 3 are used in the following explanations).

Among these additional registers, the Y-color additional register (REGY) 16-1 is provided so as to form a pair together with the Y-color RAM/register unit 13-1, and connected via the logical sum circuit 17-1 to the chip select signal generating unit 12 and the Y-color RAM/register unit 13-1. That is, these members are connected in the following manner: a chip select signal supplied from the chip select signal generating unit 12, and the signal supplied from the REGY 16-1 are input into the logical sum circuit 17-1; the logical sum circuit 17-1 calculates a logical sum of these signals; and the calculated results are supplied to the Y-color RAM/register unit 13-1.

Thereafter, when it is desired that the Y-color register unit 13-1 is caused to be write-enable regardless of the kind of the chip select signal supplied to the Y-color RAM/register unit 13-1, setting is executed beforehand in a manner that a signal for causing the Y-color RAM/register unit 13-1 to be write-enable is stored in the Y-color additional register (REGY) 16-1. Note that, in this case, the signal to be stored in the REGY 16-1 is defined as a negative logic so as to conform to the configuration in which the chip select signal is defined as a negative logic.

The setting ensures that, even when the chip select signal supplied to the Y-color RAM/register unit 13-1 is not a signal which does not cause the RAM/register unit 13-1 to be write enable (for example, MCS-0), the control data, supplied to the Y-color register unit 13-1, is always written in the Y-color RAM/register unit 13-1. This is because when, in the logical sum circuit 17-1, a logical sum is obtained on the basis of the chip select signal, which does not cause the RAM/register unit 13-1 to be write-enable, and the signal, which is output from the REGY 16-1 and causes the Y-color RAM register unit 13-1 to be write-enable, and consequently the Y-color RAM/register unit 13-1 is caused to be write-enable.

In the same manner as the REGY 16-1, the other element color additional registers 16-2 to 16-4 are connected, respectively, to the corresponding element color RAM/register units 13-2 to 13-4 and to the logical sum circuits 17-2 to 17-4. Further, similarly to the case of the REGY 16-1, storing of a signal, which causes the corresponding RAM/register unit 13-2 to 13-4 to be write-enable, can be set regardless of the kind of the chip select signal.

The above configuration ensures that, when the user wishes to write a same control data into his desired plurality of RAM/register units, only by setting the plurality of additional registers in such a manner as to conform to this, writing into the plurality of RAM/register units can be executed at one time. For this reason, it is not necessary to repeat the same writing action with respect to the plurality of RAM/register units, thereby enhancing the efficiency of the writing action.

A second feature is that a dummy color code register 18 (in FIG. 3, denoted as "DCCODEREG" ) which outputs a dummy color code is newly provided. Specifically, as shown in FIG. 3, a selector 19 (denoted as "SEL" in FIG. 3) is provided on the signal line which connects the printer unit 15 and the image processing unit 14; whereby one input of the selector 19 is supplied with a color code given from the printer unit 15, the other input of the selector 19 is supplied with a dummy color code supplied from the dummy color code register 18, and the color code and the dummy color code can be switched at the selector 19. The term "dummy color code" as used herein refers to a signal which exhibits the same function as a color code.

Owing to this configuration, when an evaluation is performed as to whether the apparatus according to the present invention operates properly, if the operator desires to cause the image processing unit 14 to read control data of an element color (for example, M-color) different from the element color (Y color) under a transferring action, his or her desired reading operation can be realized only by switching the selector 19 to cause the dummy color code register 18 to output a dummy color code of the different element color (M-color). Alternatively, when an evaluation is performed, even where the printer unit 15 is not connected to the image processing unit 14, when the selector 19 is switched so as to cause the dummy color cord register 18 to supply a dummy color code to the image processing unit 14, the evaluation can be performed in the same manner as the case where the printer unit 15 is connected thereto.

(3) Other Embodiments (3-1) In the above-mentioned embodiments, the configuration is adopted in which each of the four element color RAM/register units is adapted to store the control data with respect to each element color. Owing to this configuration, when there are common data among the data stored in the RAM/register units, the common data are stored in the respective RAM/register units in duplicate manners. Considering such a relationship among data, a configuration may be adopted in which the fifth RAM/register unit which stores such overlapping control data of duplicate manner, and only the control data unique to each element color is stored in the element color RAM/register units.

(3-2) Further, in the above embodiment, RAM/register units are provided with respect to the four element colors: yellow, magenta, cyan, and black, but the number of the RAM/register units and the types of colors treated by the RAM/register units are not restricted thereto.

(3-2-1) For example, a configuration may be adopted in which further RAM/register units are provided with respect to a mixed color of Y and M, a mixed color of M and C, and a mixed color of C and Y, whereby seven RAM/register units are provided in total.

(3-2-2) Alternatively, the RAM/register units may be provided with respect to three primary colors of light, red (R), green (G) and blue (B) (that is three RAM/register units in total).

(3-2-3) Further, a configuration may be adopted in which two RAM/register units are provided, writing of the control unit and the printing operation are performed alternately. Specifically, the control data with respect to the first element color is written in the first RAM/register unit, and in accordance with this control data, a printing action of the element color is performed. During the period when the printing action is being performed, a control data associated with the second element color is written in the second RAM/register unit. When the printing action associated with the first RAM/register unit is completed, the printing action is performed in accordance with the control data stored in the second RAM/register unit. During the period when the printing action is being executed, a control data associated with, the third element color is written in. Also in the subsequent operations, writing of control data and an execution of a printing action are executed in such an alternate manner that, during the period when the printing action is being executed with respect to one element color, on the other hand, a control data associated with an element color is written in. In this embodiment, all that need to be done is to provide the two RAM/register units, so that a configuration is made simplified, thus reducing the manufacturing costs.

(4) Advantages of the Invention

As described above, in the present invention, since a plurality of RAM/register units are provided with respect to one image processing unit, the constitution is simplified, so that generating an image processing unit which is not used during the transferring action can be avoided, so that the manufacturing cost can be reduced.

Further, control data of each element color is previously stored in each of the element color RAM/register units before starting the image processing action, so that it is not needed to rewrite the contents of the RAM/register unit when the element color is changed, whereby high-speed printing is enabled.

What is claimed is:

1. A color image forming apparatus in which images of a plurality of element colors are sequentially transferred to form a color image, the color image forming apparatus comprising:
   control means for giving control data to be used for processing control of the image data associated with the element color;
   a plurality of temporary storage means, each being provided for each of the element colors and temporarily storing control data supplied from the control means in an address of its own obtained on the basis of the address supplied from the control means;
   writing selection means which generates, on the basis of the address supplied from the control means, the selection signal which selects one of the plurality of temporary storage means;
   image processing means which processes, on the basis of the control data stored in the plurality of temporary storage means, an image data associated with a received element color;
   printing means which performs transfer of an element color on the basis of the processing result of the image processing means and supplies a color code representing an element color which is being subjected to transferring to the image processing means; and
   an additional temporary storage means, provided in a manner as to constitute a pair with each of the temporary storage means, for causing the temporary storage means to be a write-enable state, wherein a logical sum of a selection signal generated at the writing selection means and a signal supplied from the additional temporary storage means is calculated so as to write, in accordance with the result of the calculation, the control data supplied from the control means.

2. The image forming apparatus according to claim 1, further comprising dummy color code storage means for storing a dummy color code, the dummy color code functions as the color code, wherein one of the color code supplied from the printing means and the dummy color code supplied from the dummy color code storing means is switchably supplied to the image processing means.

3. A color image forming apparatus in which images of a plurality of element colors are sequentially transferred to form a color image, the color image forming apparatus comprising:
   a CPU that gives control data to be used that processes control of the image data associated with the element color and that gives an address;
   a plurality of RAM/register unit each of which is provided for each of the element colors and temporarily stores control data supplied from the CPU in an address of its own obtained on the basis of the address supplied from the CPU;
   writing selection unit which generates, on the basis of the address supplied from the CPU, the selection signal to select one of the plurality of RAM/register units, and writes the control data supplied from the CPU in the RAM/register unit which is selected by the selection signal;

an image processing unit which processes, on the basis of the control data stored in the plurality of RAM/register unit, an image data associated with a received element color;

a printer unit which performs transfer of an element color on the basis of the processing result of the image processing unit and supplies a color code representing an element color which is being subjected to transferring to the image processing unit; and an additional register, provided in a manner as to constitute a, pair with each of the RAM/register unit, that causes the RAM/register unit to be a write-enable state, wherein a logical sum of a selection signal generated at the writing selection unit and a signal supplied from the additional register is calculated so as to write, in accordance with the result of the calculation, the control data supplied from the CPU.

4. The color image forming apparatus according to claim 3, further comprising a dummy color code register that stores a dummy color code wherein the dummy color code functions as the color code, wherein one of the color code supplied from the printer unit and the dummy color code supplied from the dummy color code register is supplied to the image processing unit in a switchable manner.

* * * * *